US012097600B2

(12) United States Patent
Young et al.

(10) Patent No.: US 12,097,600 B2
(45) Date of Patent: Sep. 24, 2024

(54) TOOL AND TOOL ATTACHMENT

(71) Applicant: Illinois Tool Works Inc., Glenview, IL (US)

(72) Inventors: Graeme Laurence Young, Hamilton (NZ); Gordon Douglas Irving, Auckland (NZ); Simon Gerard Hall, Auckland (NZ); Ashif Iqbal Memon, Auckland (NZ)

(73) Assignee: Illinois Tool Works Inc., Glenview, IL (US)

( * ) Notice: Subject to any disclaimer, the term of this patent is extended or adjusted under 35 U.S.C. 154(b) by 527 days.

(21) Appl. No.: 17/317,439

(22) Filed: May 11, 2021

(65) Prior Publication Data

US 2021/0260741 A1 Aug. 26, 2021

Related U.S. Application Data

(63) Continuation of application No. 15/759,013, filed as application No. PCT/US2016/052675 on Sep. 20, 2016, now Pat. No. 11,020,843.

(30) Foreign Application Priority Data

Sep. 21, 2015 (NZ) ........................................ 712550

(51) Int. Cl.
*B25C 7/00* (2006.01)
*E04H 17/00* (2006.01)
(Continued)

(52) U.S. Cl.
CPC ............. *B25C 7/00* (2013.01); *E04H 17/017* (2021.01); *B25C 5/13* (2013.01); *B25C 5/15* (2013.01)

(58) Field of Classification Search
CPC ....... E04H 17/017; E04H 17/04; E04H 17/06; E04H 17/10; E04H 17/12; E04H 17/124; H01B 17/145; H01B 17/16
See application file for complete search history.

(56) References Cited

U.S. PATENT DOCUMENTS 647,169 A * 4/1900 Vogel ........................ F16L 3/04
411/459
1,106,694 A * 8/1914 Zaring .................. E04H 17/124
256/49
(Continued)

FOREIGN PATENT DOCUMENTS

DE 32 22549 12/1983
DE 3633987 A1 4/1988
(Continued)

OTHER PUBLICATIONS

International Search Report and Written Opinion from International Patent Application No. PCT/US2016/052675, dated Jan. 2, 2017 (11 pages).
(Continued)

*Primary Examiner* — Daniel J Wiley
(74) *Attorney, Agent, or Firm* — Neal, Gerber & Eisenberg LLP

(57) ABSTRACT

A tool for fastening an insulator to a support, the insulator including an insulator body having a front and back, a formation for supporting a barrier, and at least one mounting formation having a front and a back by which the insulator is attached to a support, the back of the mounting formation in use being proximal to the support, at least one of the at least one mounting formation including at least one passage extending transversely through the mounting formation from the front to the back of the mounting formation, and at least one alignment member, the tool including a driver blade for driving a staple, and at least one passage alignment
(Continued)

member, in use the at least one passage alignment member aligning at least one passage of the insulator, with one leg of a staple.

19 Claims, 18 Drawing Sheets

(51) Int. Cl.
*B25C 5/13* (2006.01)
*B25C 5/15* (2006.01)

(56) References Cited

U.S. PATENT DOCUMENTS

| | | | | | |
|---|---|---|---|---|---|
| 2,386,129 | A * | 10/1945 | Maack | E04H 17/12 | 174/158 F |
| 3,785,619 | A * | 1/1974 | Oltmanns | E04H 17/124 | 256/48 |
| 3,820,758 | A * | 6/1974 | Berg, Jr. et al. | H01B 17/145 | 256/10 |
| 3,998,372 | A * | 12/1976 | Leonardo | B25C 1/18 | 227/9 |
| 4,124,189 | A * | 11/1978 | Einhorn | A47G 1/20 | 248/304 |
| 4,582,288 | A * | 4/1986 | Ruehl | F16L 3/04 | 411/908 |
| 4,684,050 | A * | 8/1987 | Masas | B25C 1/188 | 227/8 |
| 4,771,137 | A * | 9/1988 | Thompson | H01B 17/145 | 174/172 |
| D300,423 | S * | 3/1989 | Reeves | 174/163 F | |
| 4,982,932 | A * | 1/1991 | Baker | E04H 17/12 | 256/48 |
| 5,063,274 | A * | 11/1991 | Johnson | H01B 17/145 | 174/175 |
| 5,314,160 | A * | 5/1994 | Larsen | A47G 1/20 | 411/441 |
| 5,484,094 | A * | 1/1996 | Gupta | B25C 1/18 | 227/119 |
| 5,626,316 | A * | 5/1997 | Smigel | H02G 3/32 | 248/68.1 |
| 5,676,351 | A * | 10/1997 | Speece | E04H 17/124 | 256/54 |
| 6,489,569 | B1 * | 12/2002 | Thomson | H01B 17/145 | 248/548 |
| 6,583,363 | B1 * | 6/2003 | Wilson, Jr. | H01B 17/145 | 256/10 |
| 6,824,122 | B2 * | 11/2004 | Spyrakis | E04H 17/00 | 256/19 |
| 6,872,892 | B1 * | 3/2005 | Burdick | H01B 17/145 | 174/45 R |
| 6,960,728 | B1 * | 11/2005 | Halderman | H01B 17/145 | 174/160 |
| 7,118,318 | B2 * | 10/2006 | Ryals | H02G 3/32 | 411/475 |
| 7,178,789 | B1 * | 2/2007 | Lehmann | E04H 17/12 | 256/48 |
| 7,511,227 | B2 * | 3/2009 | Ritchie | H02G 3/263 | 256/10 |
| 7,712,646 | B2 * | 5/2010 | Gamble | B25C 7/00 | 227/124 |
| 7,870,987 | B1 | 1/2011 | Zhang | | |
| 8,235,270 | B2 * | 8/2012 | Gosis | B25C 7/00 | 227/19 |
| 8,277,160 | B1 * | 10/2012 | Strauel | F16B 15/0015 | 411/475 |
| 9,551,457 | B2 * | 1/2017 | Johns | E04H 17/24 | |
| 9,679,682 | B2 * | 6/2017 | Wall | H01B 17/145 | |
| 10,428,554 | B2 * | 10/2019 | Johns | E04H 17/124 | |
| 10,934,741 | B2 * | 3/2021 | Malins | H01B 17/145 | |
| 2002/0025218 | A1 * | 2/2002 | Tan | H01B 17/145 | 403/322.4 |
| 2010/0327037 | A1 * | 12/2010 | Zhang | B25C 1/008 | 227/8 |
| 2016/0003409 | A1 * | 1/2016 | Johns | E04H 17/1447 | 248/218.4 |
| 2016/0025241 | A1 * | 1/2016 | Johns | E04H 17/24 | 248/65 |
| 2018/0223560 | A1 * | 8/2018 | Malins | E04H 17/124 | |
| 2018/0254128 | A1 * | 9/2018 | Stoner | H01B 17/145 | |
| 2022/0372784 | A1 * | 11/2022 | Sutherland | E04H 17/124 | |

FOREIGN PATENT DOCUMENTS

| | | |
|---|---|---|
| EP | 0255213 A1 | 2/1988 |
| EP | 1 733 463 | 12/2006 |
| EP | 2 269 773 | 1/2011 |

OTHER PUBLICATIONS

International Preliminary Report on Patentability from International Patent Application No. PCT/US2016/052675, dated Mar. 27, 2018 (8 pages).

Patent Examination Report 1 from New Zealand Application No. 779860, dated May 31, 2023 (4 pages).

* cited by examiner

TOOL AND TOOL ATTACHMENT

PRIORITY CLAIM

This patent application is a continuation of and claims priority to and the benefit of U.S. patent application Ser. No. 15/759,013, which was filed on Mar. 9, 2018, which is a national stage entry of and claims priority to and the benefit of PCT Application No. PCT/US2016/052675, which was filed on Sep. 20, 2016, which claims priority to and the benefit of New Zealand Patent Application No. 712550, which was filed on Sep. 21, 2015, the entire contents of each of which are incorporated herein by reference.

FIELD

The present disclosure relates to a tool and attachment for a tool. In particular, the present disclosure relates to tool and attachment for a fastening tool for fastening an insulator to a support. More particularly, the present disclosure relates to a powered stapler and attachment for fastening a fence insulator to a support.

BACKGROUND

Electric fences are in widespread use in a number of applications, including farming and security. Electric fences are a particularly important tool in farming applications due to their flexibility and ease of use.

An insulator is commonly provided to enable an electric fence barrier element to be secured to a fence post, standard or support. The insulator in addition to securing the electric fence barrier element electrically insulates the fence post, standard or support from the electric fence barrier element.

Fence support, fence standard and fence post are used interchangeably throughout. The term is used to refer to an upright or in use a substantially vertical support that is used in a fence to support a barrier element.

Throughout the present specification, reference to the term "barrier element" should be understood as meaning a component of a fencing system. In certain embodiments of the present disclosure, the barrier elements may be an electric wire, or an electric fence ribbon, tape, braid or rope.

One problem for current insulators is that if staples are used to attach the insulator to a support, the staples need to be manually hammered using a hammer. This is because it is very difficult to align a powered stapler to an insulator and fire the staple legs in the correct holes in the insulator.

An advantage of the present disclosure is to provide a staple tool and attachment that can be used with an insulator.

Each advantage is to be read disjunctively with the advantage of at least providing the public with a useful choice.

The present disclosure aims to overcome, or at least alleviate, some or all of the aforementioned problems.

SUMMARY

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

According to a first aspect, the present disclosure provides a tool for fastening an insulator to a support, the insulator comprising

- an insulator body having a front and back;
- a formation for supporting a barrier; and
- at least one mounting formation having a front and a back by which the insulator is attached to a support, the back of the mounting formation in use being proximal to the support, at least one of the at least one mounting formation comprising:
  - at least one passage extending transversely through the mounting formation from the front to the back of the mounting formation; and
  - at least one alignment member,
  - the tool comprising:
  - a driver blade for driving a staple; and
  - at least one passage alignment member, in use the at least one passage alignment member aligning at least one passage of the insulator, with one leg of a staple.

In certain embodiments, the tool further comprises:

- a power source for driving the driver blade;
- a housing enclosing the driver blade, the housing including a nosepiece for accepting the staple and for axially guiding the driver blade in a driving direction toward impact with the staple; and
- an insulator securing member, the insulator securing member cooperating with a securing member on the insulator to secure the insulator to the tool.

In certain embodiments, the tool further comprises a movable workpiece contact element, wherein the staple is prevented from being ejected from the tool until the workpiece contact element has been moved into a firing position, and wherein the insulator securing member is configured for attachment to the tool workpiece contact element.

In certain embodiments, the securing member is a protrusion extending from the tool and the securing member of the insulator is an aperture.

In certain embodiments, the securing member extends in the driven direction of the staple.

In certain embodiments, the protrusion is tapered, being narrower at the distal end.

In certain embodiments, the protrusion has a ball plunger aligned substantially perpendicular to the driving direction and the ball plunger is proximal to the distal end of the protrusion.

In certain embodiments, the staple is selected from the group comprising a common, barbed, divergent and barbed divergent staples.

In certain embodiments, the at least one passage is at least two passages, each of the at least two passages extending transversely through the mounting formation, the at least two passages positioned so that a staple can be driven through two of the at least two passages, one leg of the staple in each passage and wherein the insulator alignment member ensures two passages of the insulator are aligned so that a staple leg can pass through.

In certain embodiments, the alignment element is movable between a first position in which the fastener is prevented from being ejected and a second position in which the fastener may be fired, the firing position requiring the at least one passage of the insulator to be aligned with the path of at least one staple leg.

In certain embodiments, the alignment member allows the insulator to rotate with respect to the tool.

In certain embodiments, the insulator can rotate up to 360 degrees with respect to the tool.

In certain embodiments, the tool is powered by one of the group comprising pneumatic, electric, battery, CO2 and gas fuel.

In certain embodiments, the tool is for use in a fencing system.

According to a second aspect, there is provided an attachment for a fastening tool, the fastening tool having a driver blade for driving a staple, the attachment being for use with an insulator, the insulator comprising:

an insulator body having a front and back;

a formation for supporting a barrier; and at least one mounting formation having a front and a back by which the insulator is attached to a support, the back of the mounting formation in use being proximal to the support, at least one of the at least one mounting formation comprising:

at least one passage extending transversely through the mounting formation from the front to the back of the mounting formation; and the attachment comprising:

a mounting portion for mounting the attachment to the fastening tool; and at least one passage alignment member, in use the at least one passage alignment member aligning at least one passage of the insulator, with one leg of a staple.

In certain embodiments, the fastening tool has a movable workpiece contact element, the fastener being prevented from being ejected from the fastening tool until the workpiece contact element has been moved into a firing position, and wherein the mounting portion is configured for attachment to the fastening tool workpiece contact element.

In certain embodiments, the fastening tool further comprises:

a power source for driving the driver blade; and a housing enclosing the driver blade, the housing including a nosepiece for accepting the staple and for axially guiding the driver blade in a driving direction toward impact with the staple, and the attachment further comprising a securing member, the securing member cooperating with an securing member on the insulator to secure the insulator to the attachment.

In certain embodiments, the securing member extends from the mounting portion in the driven direction of the staple.

In certain embodiments, the securing member is a protrusion and the securing member of the insulator is an aperture.

In certain embodiments, the protrusion is tapered, being wider at the mounting portion end.

In certain embodiments, the protrusion has a ball plunger aligned substantially perpendicular to the driven direction and the ball plunger is proximal to distal end of the protrusion.

In certain embodiments, the staple is selected from the group comprising a common, barbed, divergent and barbed divergent staples.

In certain embodiments, the at least one passage is at least two passages, each of the at least two passages extending transversely through the mounting formation, the at least two passages positioned so that a staple can be driven through two of the at least two passages, one leg of the staple in each passage and wherein the passage alignment member ensures two passages of the insulator are aligned so that a staple leg can pass through.

In certain embodiments, the alignment element is movable between a first position in which the staple is prevented from being ejected and a second position in which the staple may be fired, the firing position requiring the at least one passage of the insulator to be aligned with the path of the staple.

In certain embodiments, the alignment member allows the insulator to rotate with respect to the attachment.

In certain embodiments, the insulator can rotate up to 360 degrees with respect to the attachment.

In certain embodiments, the tool is powered by one of the group comprising pneumatic, electric, battery, CO2, and gas fuel.

In certain embodiments, the attachment is for use in a fence system.

BRIEF DESCRIPTION OF THE DRAWINGS

Embodiments of the present disclosure will now be described, by way of example only, with reference to the accompanying drawings, in which.

DETAILED DESCRIPTION

Referring to the figures, an insulator 1 is provided for securing a fence barrier element 142 to a fence support 120 such as a fence post or fencing standard. The fence barrier element 142 will typically be in an electric fence 141 but the fence may not necessarily be an electric fence. The insulator 1 is suitable for use in a non-electric fence.

Figure 9:
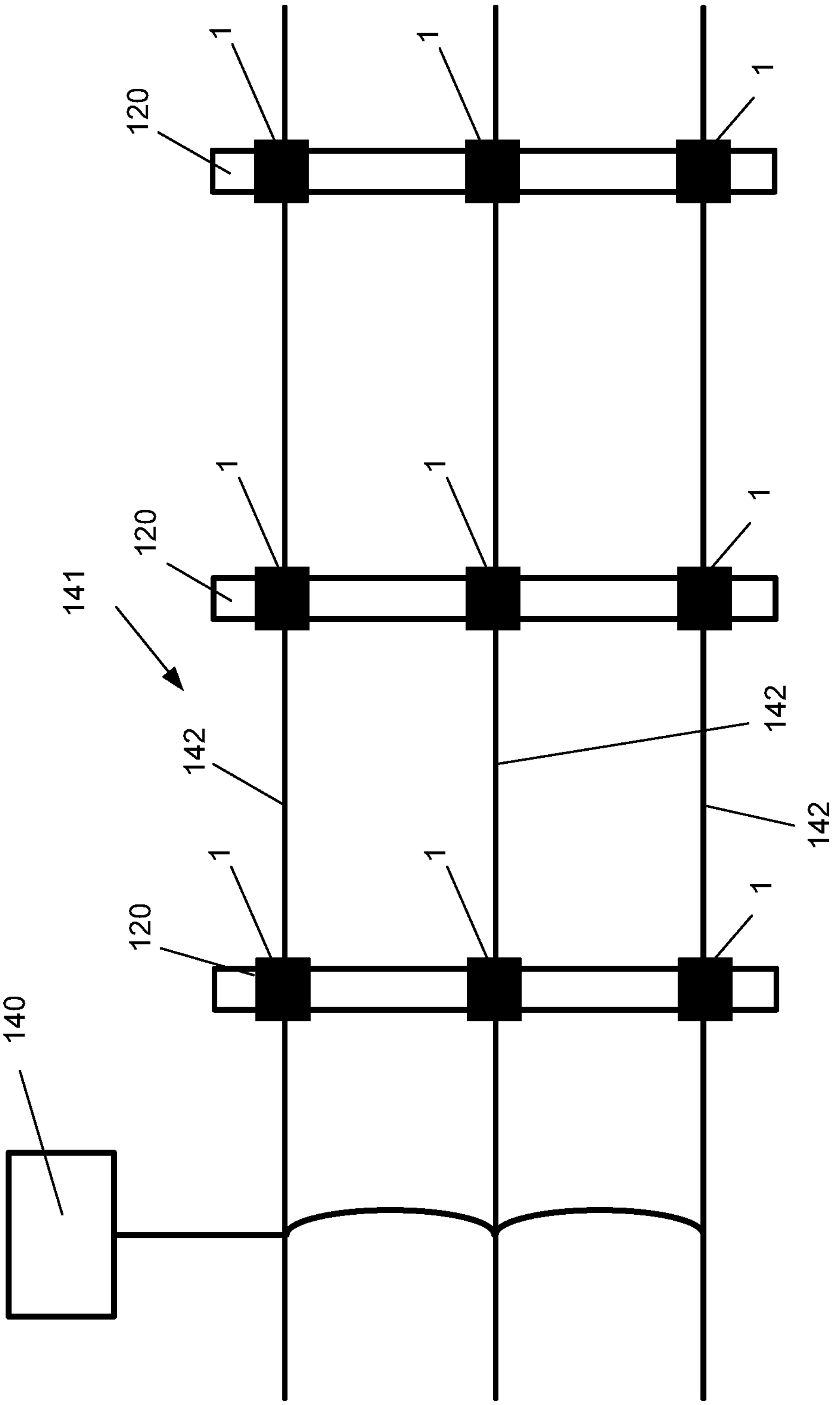
FIG. 9 shows a diagram of part of an example electric fence system.

An example of an electric fence system 141 is illustrated in FIG. 9. An electric fence energizer 140 is connected to electric fence barrier elements 142. The electric fence barrier elements 142 are supported by fence supports 120 and the electric fence barrier elements 142 are secured to the fence supports 120 by insulators 1.

The fence support 120 may be made of wood, plastic, fiberglass, concrete or other suitable material.

Referring to FIGS. 1 to 6, the insulator 1 of this illustrated example embodiment of the present disclosure has an insulator body 2. Integral with the insulator body 2 is a formation for supporting a barrier element 142 and a mounting formation for mounting or securing the insulator 1 to a fence support 120.

In one embodiment, the formation for supporting the barrier element 142 includes a pair of limbs 12 and 13 extending in a spaced apart relation. Each of the limbs 12 and 13 defines respective holes 14 and 15 through which a pin 16 can pass. The holes 14 and 15 are coaxially aligned. In use, a barrier element 142 is secured between the limbs 12 and 13 and the pin 16 is secured in the holes 14 and 15 with the barrier element 142 secured in a position between the limbs 12 and 13 by the pin 16.

The pin 16 for securing the barrier element 142 is optionally attached to the insulator 1 by a tie 2,1 and for ease of insertion an insertion assistance member 22 may be provided. The insertion assistance member 22 makes it easier for the pin 16 to be inserted using a thumb, a finger, fingers or any combination thereof. The pin 16 may have barbs 29 for securing the pin 16 in the holes 14 and 15. One part of the pin 16 may have a shoulder portion 30 so that the part of the pin 16 with the shoulder portion 30 provides a friction fit in at least one of the holes 14 and 15.

Figure 6:
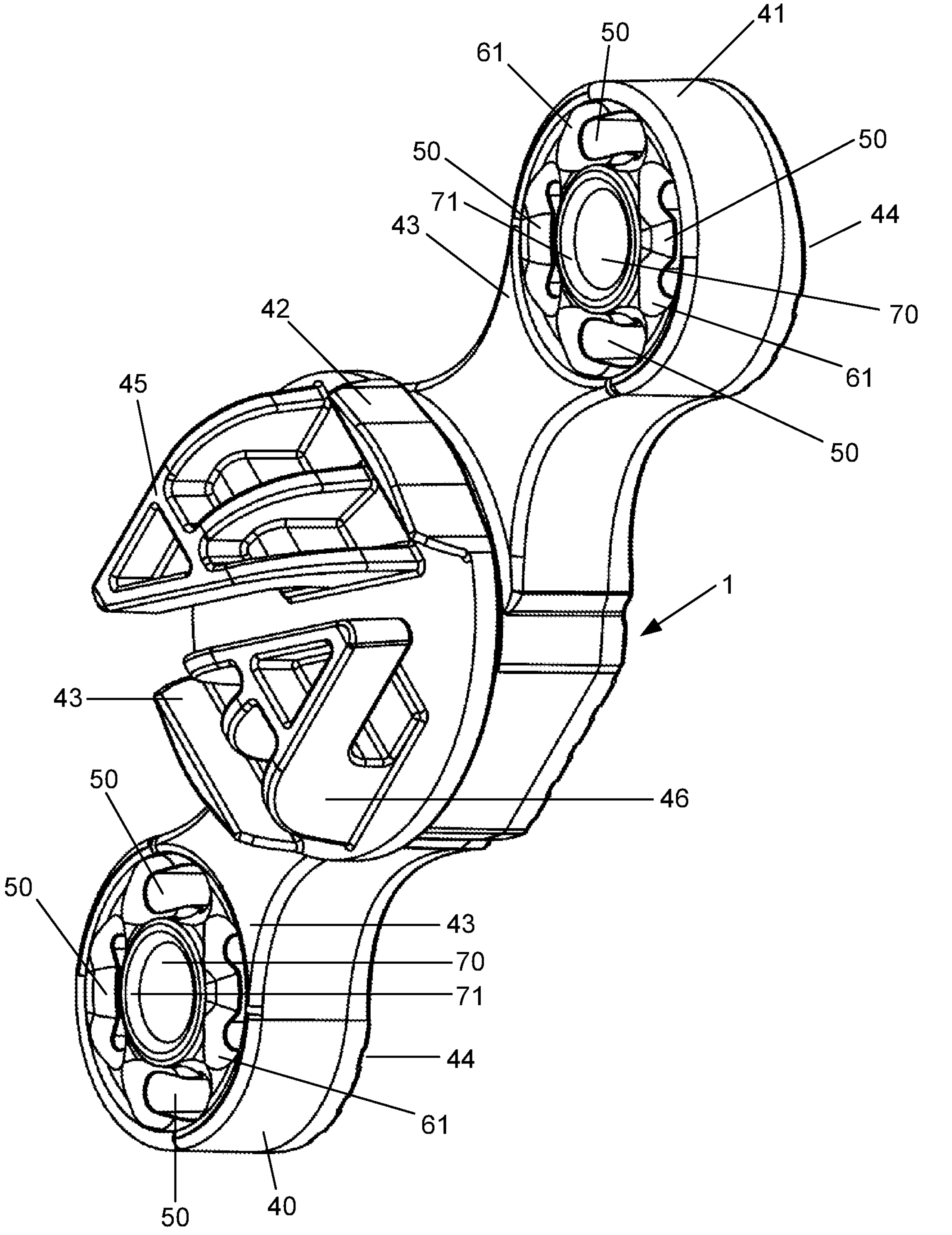
FIG. 6 shows a perspective view of an insulator.

Alternatively, referring to FIG. 6. the formation for supporting a barrier element 142 may be a pair of opposed claws 45 and 46.

The formation by which the insulator 1 is attached to the fence support 120 has (referring again to FIGS. 1 to 6) at least one mounting formation 40. In an alternative embodiment, the insulator may have two mounting formations 40 and 41.

Mounting formations 40 and 41 have a front side 43 and a back side 44 by which the insulator 1 is attached to a support 120. The back of each mounting formation 44 (when the insulator 1 is being used) is proximal to the support 120.

Each mounting formation 40 and 41 has or defines a quantity of passages 50 extending transversely through the respective mounting formation 40 and 41 from the front side 43 to the back side 44 of the respective mounting formations 40 and 41.

In one embodiment of the present disclosure, there is at least one passage 50 in each respective mounting formation 40 and 41 and the passage 50 is an arc slot. In other embodiments, there may be multiple passages 50 which may be arced slots or other shaped passages 50 including circular holes.

Figure 7:
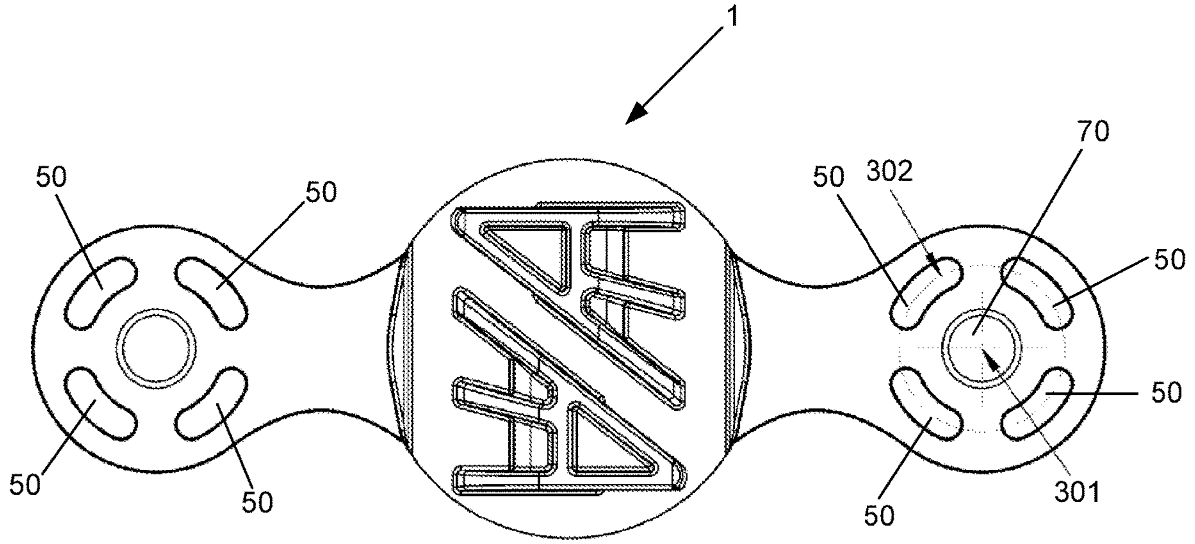
FIG. 7 shows an insulator showing the pitched circle alignment of the passages.
Figure 8:
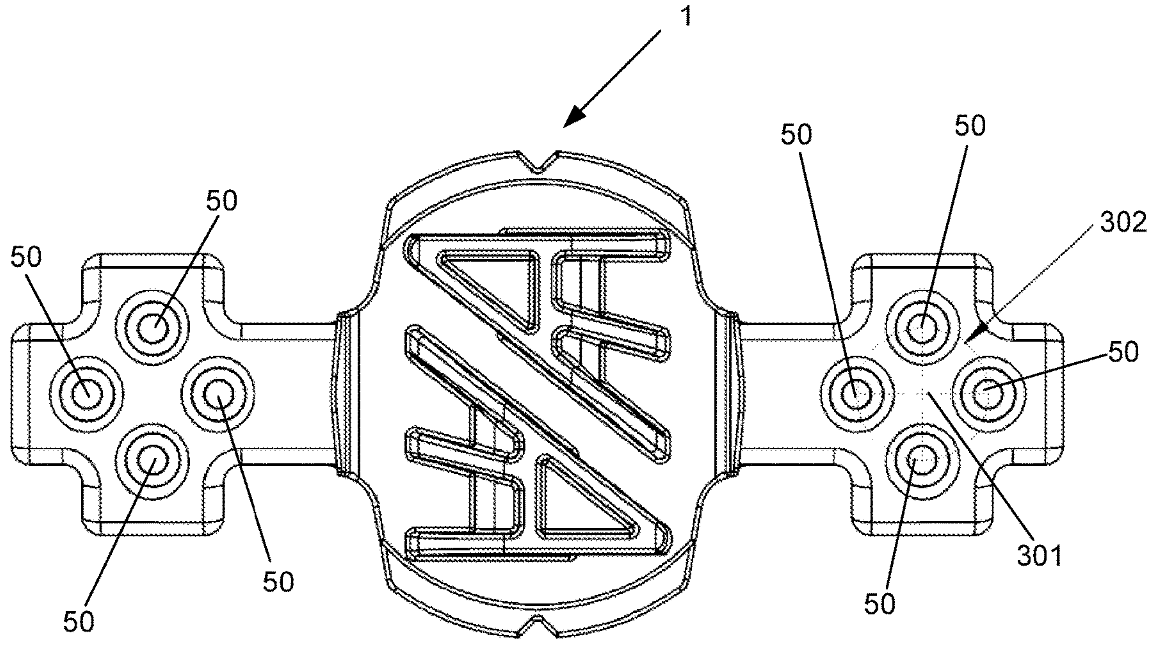
FIG. 8 shows an alternative insulator showing the pitched circle alignment of the passages.

Referring to FIGS. 7 and 8, in one embodiment, at least two of the passages 50 are aligned on a pitch circle 302.

Many other combinations of passages 50 are possible (in accordance with the present disclosure) including three or four substantially circular passages, some or all of which may be aligned on a pitch circle 302. The end of the passage 50 at the front side 43 of the mounting formations 40, 41 may in one embodiment be beveled 61.

The insulator 1 in certain embodiments has an alignment member 70 in each respective mounting formation 40 and 41. The axis of the alignment member is substantially perpendicular to the front 43 of the mounting formation. In use with a stapler having a suitable muzzle attachment, the alignment member 70 cooperates with a respective first alignment member of a stapler attachment and a passage 50 cooperates with a second alignment member of the stapler muzzle attachment to align a stapler with the mounting formation so at least one leg of a staple is fired though a passage 50. In certain embodiments, each leg of a staple is fired through a passage 50.

Referring to FIG. 7, the axis 301 of the pitch circle 302 is in one embodiment the same axis as the axis of the alignment member 70.

The alignment member 70 is in certain embodiments an aperture or passage through the respective mounting formation 40 and 41. Alternatively, the alignment member 70 may be a protrusion. The alignment member 70 is in certain embodiments tapered and has a beveled opening 71 if a passage or beveled end if a protrusion.

In one embodiment, the alignment member 70 has a step 72 that matches a step on an alignment member of a stapler attachment to assist in securing the insulator 1 to the stapler. The alignment member 70 of the insulator 1 and the first alignment member of a stapler muzzle attachment are in certain embodiments a friction fit.

The alignment member of a stapler muzzle attachment if a probe may have a ball plunger proximal the distal end of the probe, in use the ball plunger fits within the alignment passage step 72 of the insulator 1. Alternatively, the alignment member of a stapler muzzle attachment may have a split ring in a slot on the probe that fits within the insulator alignment passage step 72.

If the alignment member 70 of the insulator 1 is a protrusion/probe and the alignment member of the stapler attachment is a passage, a ball plunger may be located within the passage and the alignment member 70 of the insulator may have a step proximal the distal end into which the ball plunger ball fits.

Alternatively, if the alignment member 70 of the insulator 1 is a protrusion/probe and the alignment member of the stapler attachment is a passage, a split ring may be located in a slot within the passage and the alignment member 70 may have a slot proximal the distal end into which in use the split ring fits.

The alignment member 70 is in certain embodiments substantially circular and allows the insulator 1 to rotate when the insulator 1 alignment member 70 and the alignment member of a stapler muzzle attachment are mated. In certain embodiments, the insulator can rotate up to 360 degrees.

The insulator 1 may additionally have a securing member for securing the insulator 1 to a stapler attachment. In one embodiment illustrated in FIG. 10, the securing member includes slots 402 and 403 in the mounting formations 40 and 41. However, the securing member may be an indent or a hole in each of the mounting formations 40 and 41. The insulator 1 may have multiple securing members.

Figure 1:
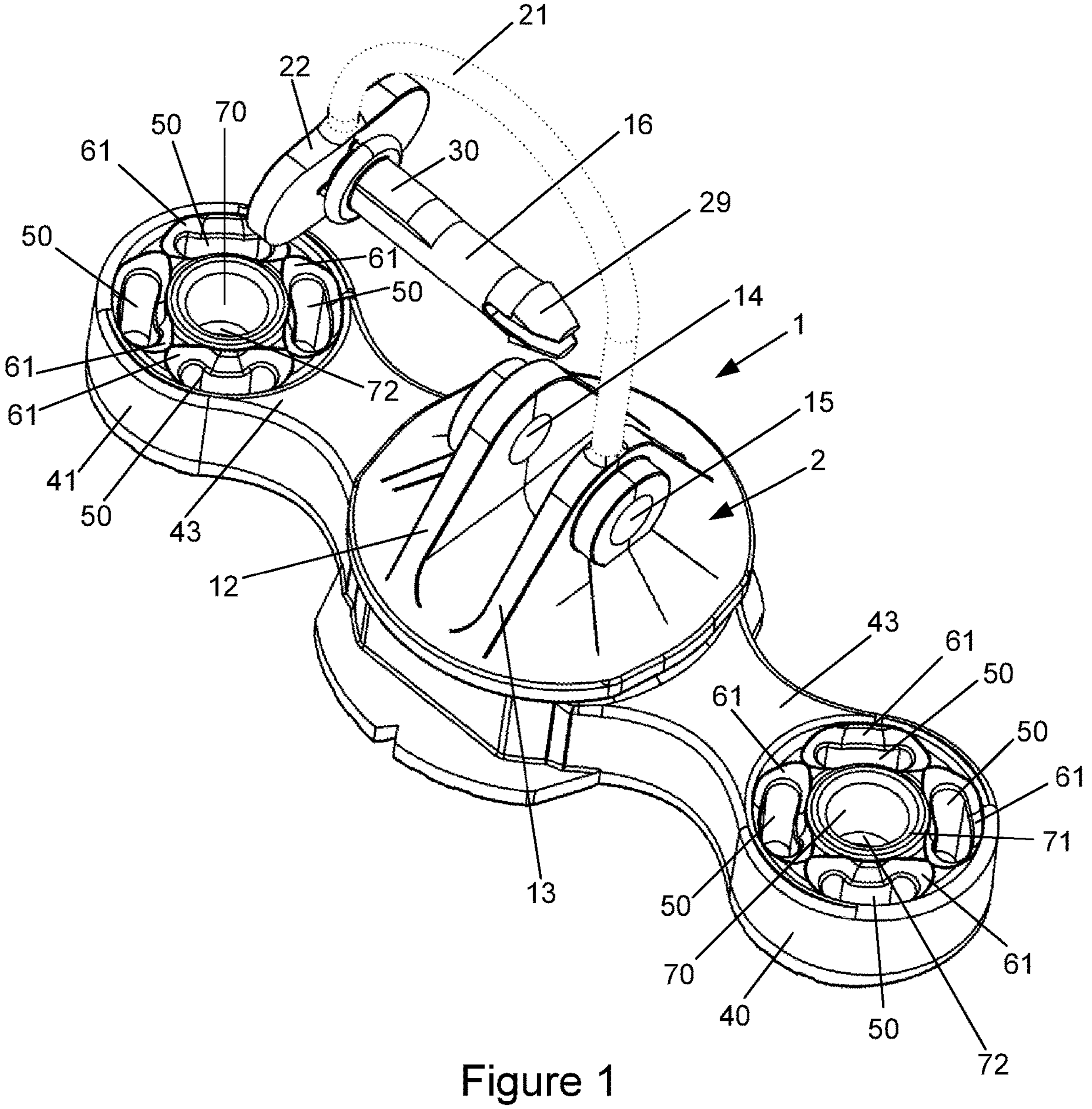
FIG. 1 shows a front perspective view of an insulator.
Figure 2:
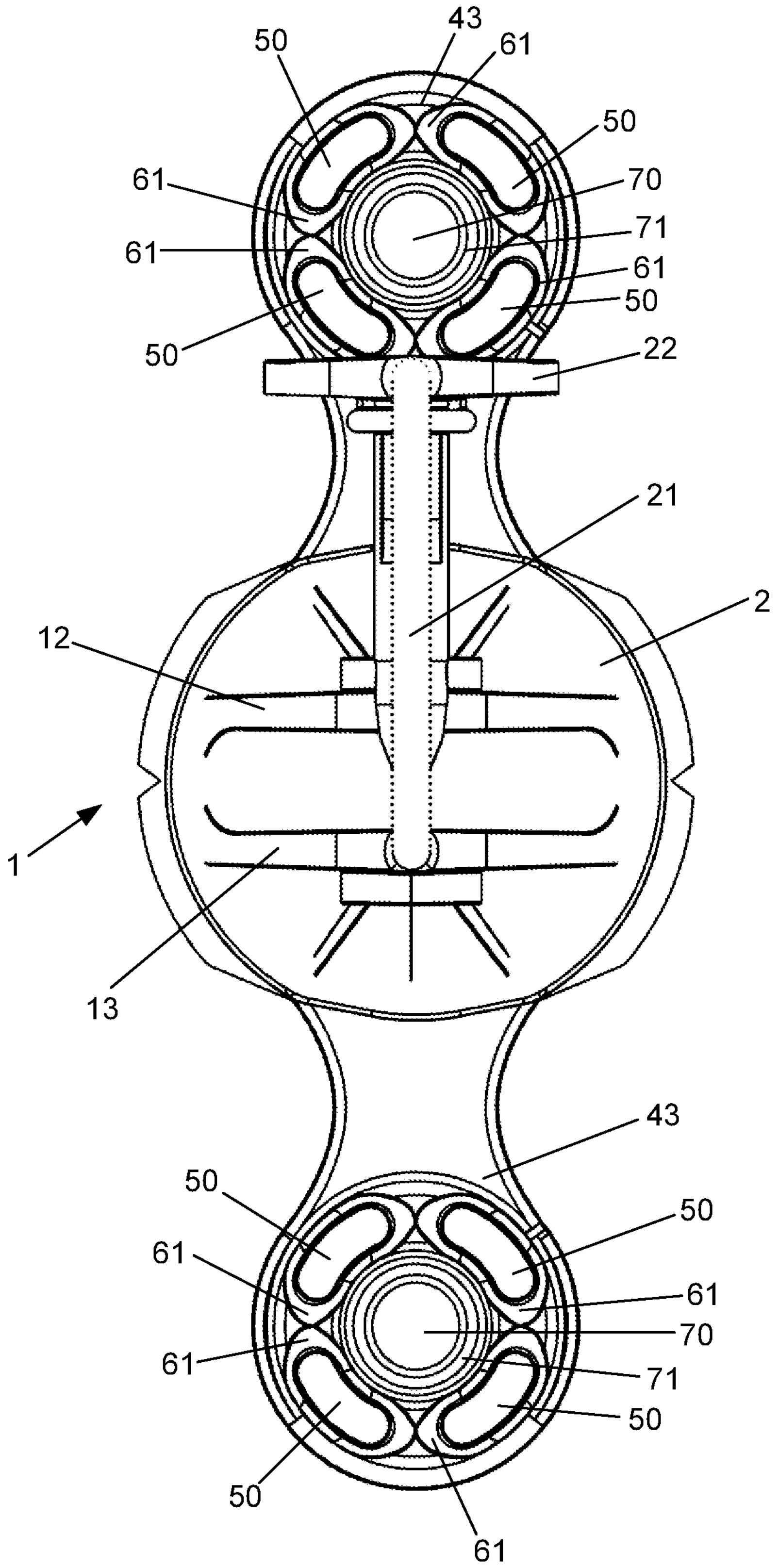
FIG. 2 shows a top view of the view of an insulator.
Figure 3:
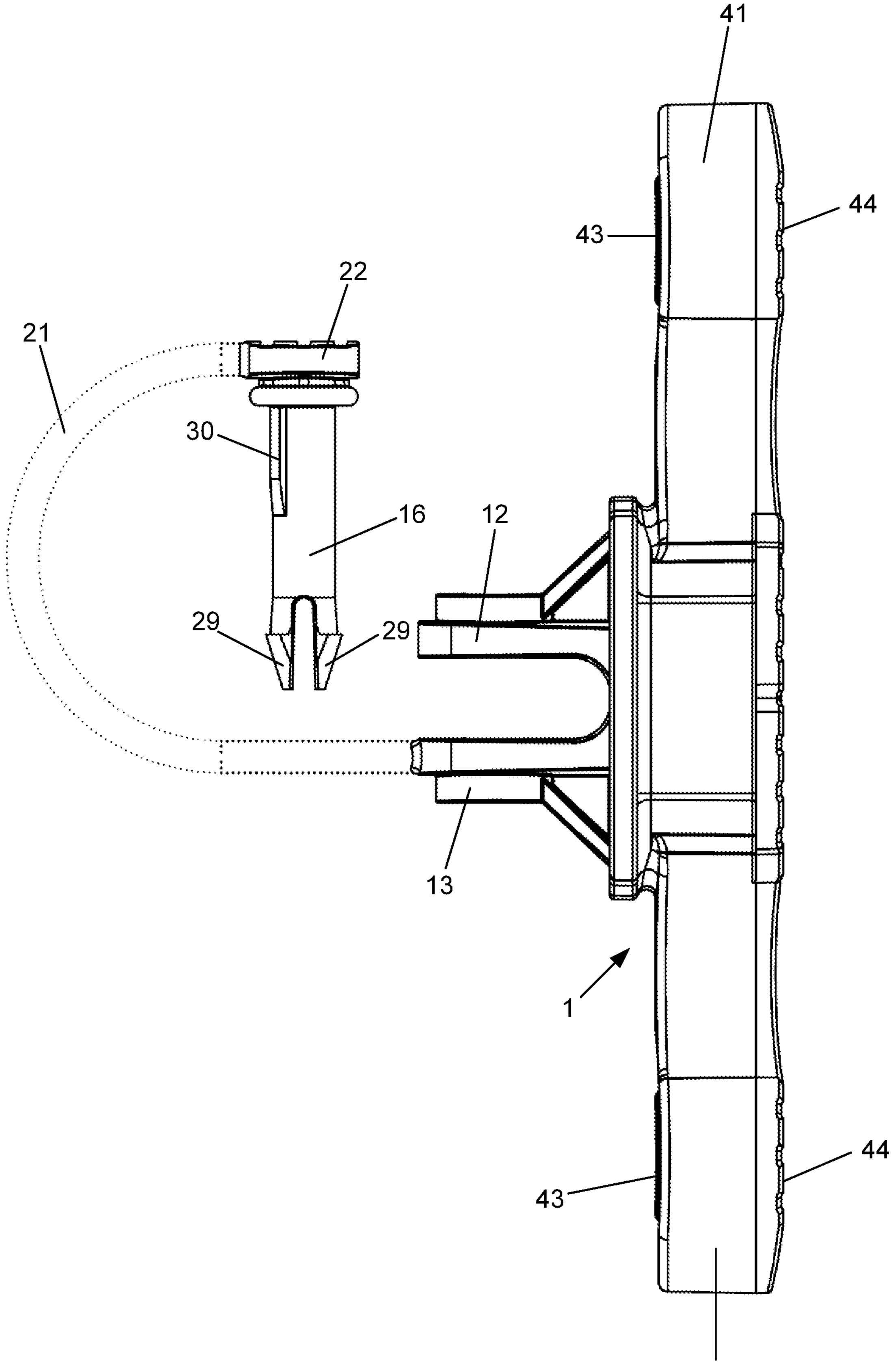
FIG. 3 shows a side view of an insulator.
Figure 4:
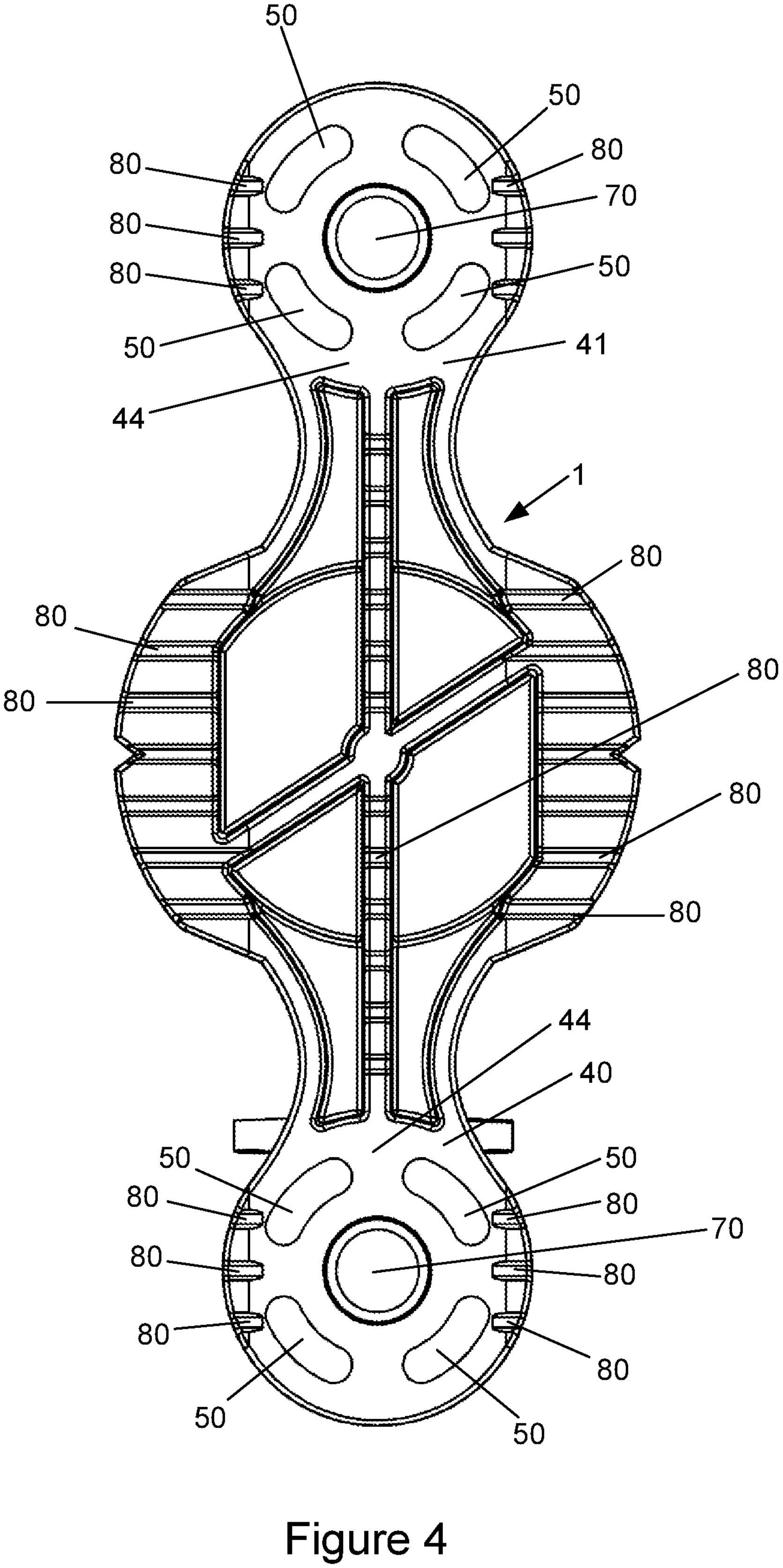
FIG. 4 shows a bottom view of an insulator.
Figure 5:
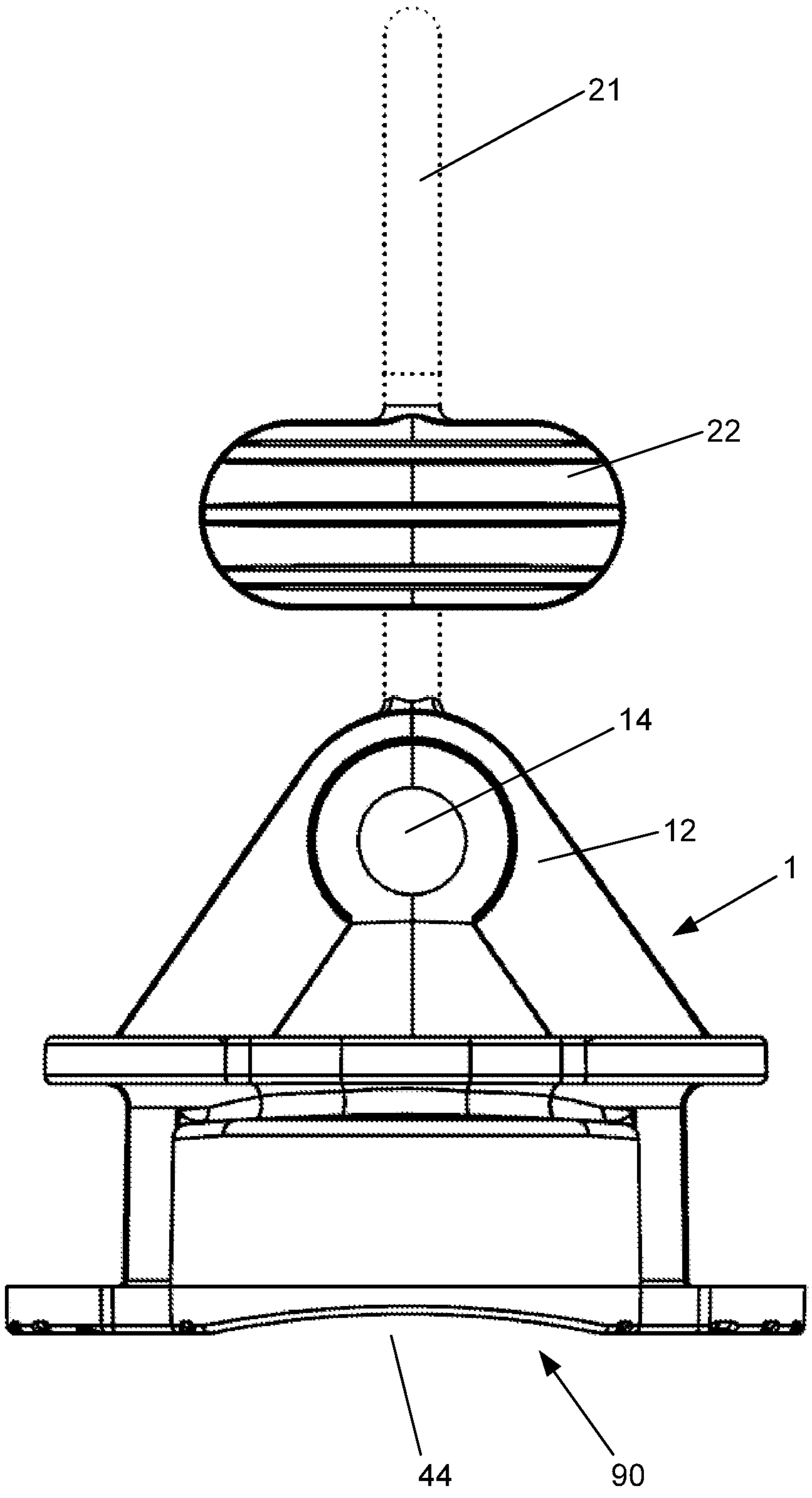
FIG. 5 shows an end view of an insulator.

The back or rear side 44 of the insulator 1 is in certain embodiments substantially oval 90 in cross section as seen in FIG. 5. The back side 44 of the insulator 1 may additionally have support gripping members 80. The support gripping members 80 may be protrusions or ridges. The oval cross section assists the insulator 1 in gripping to round fence posts (including full round, half round and quarter round). The oval cross section in various embodiments is sized for a fence post of between 100 mm and 250 mm in diameter.

The insulator 1 of certain embodiments of the present disclosure is formed using injection molding techniques that are well known in the art. The insulator 1 may be made from polyethylene, or other plastic type materials such as, for example, acetal, polypropylene, nylon, polyurethane and the like having electrical insulation properties.

Figure 10:
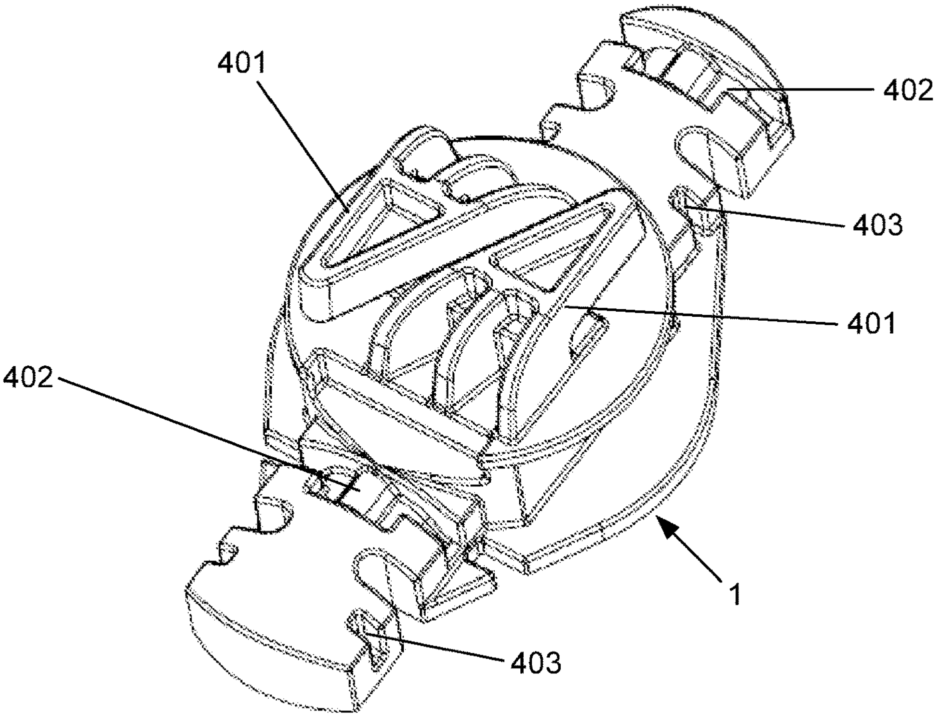
FIGS. 10 to 15 show alternative insulators.
Figure 11:
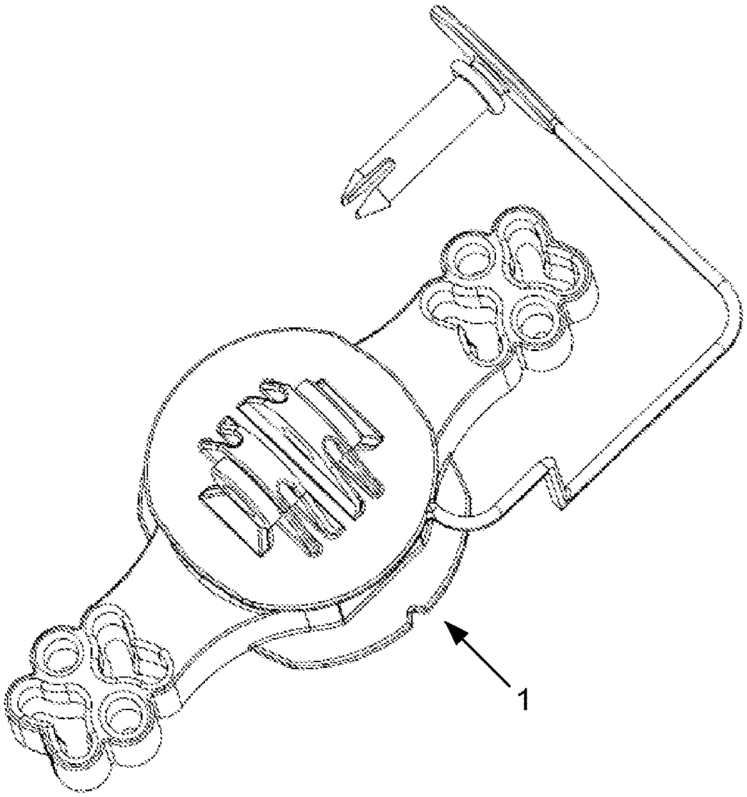
Figure 12:
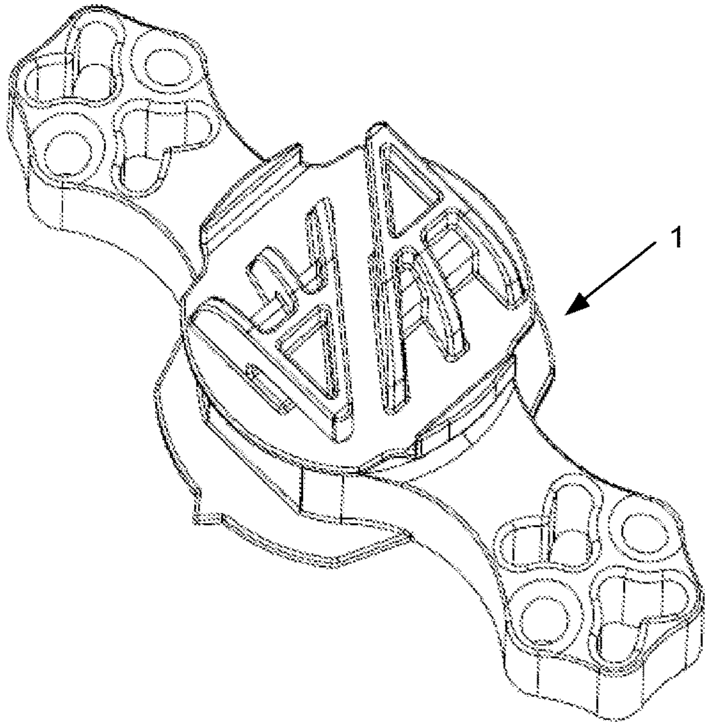
Figure 13:
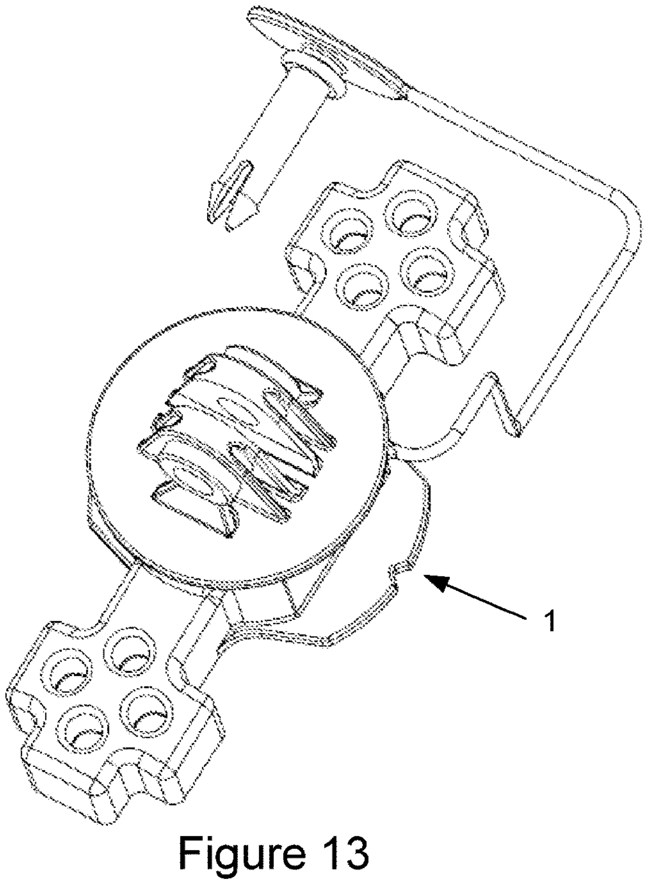
Figure 14:
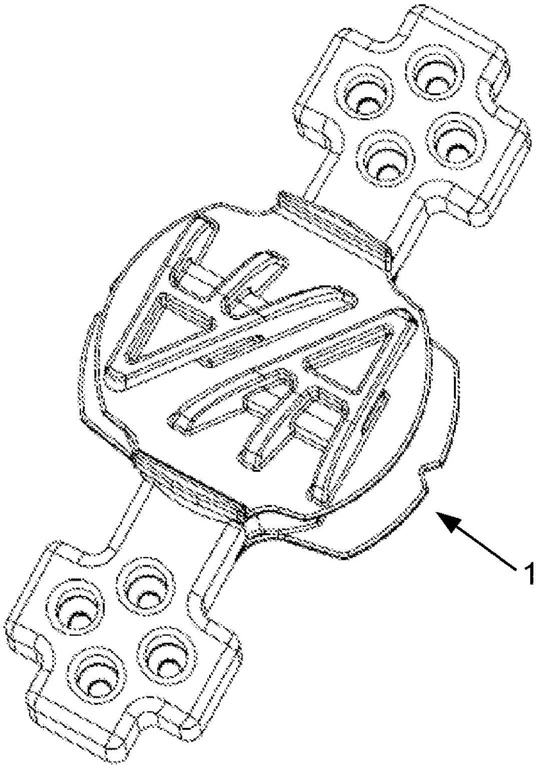
Figure 15:
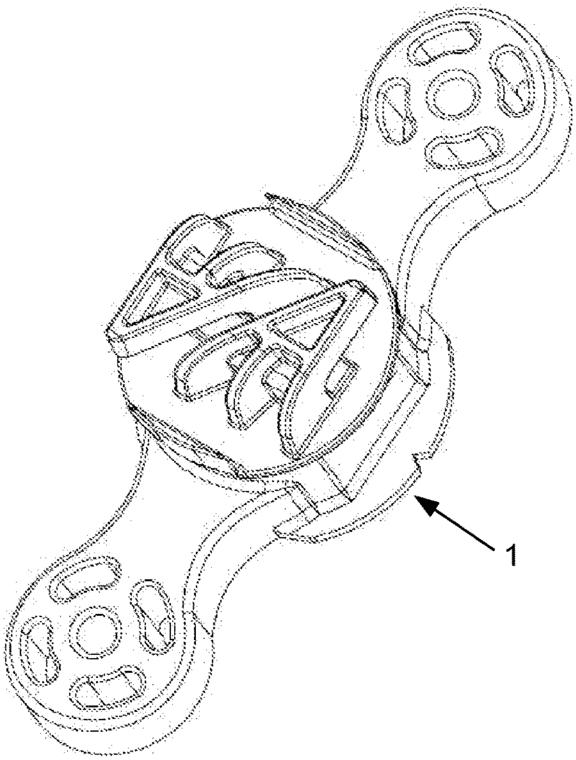
Figure 16:
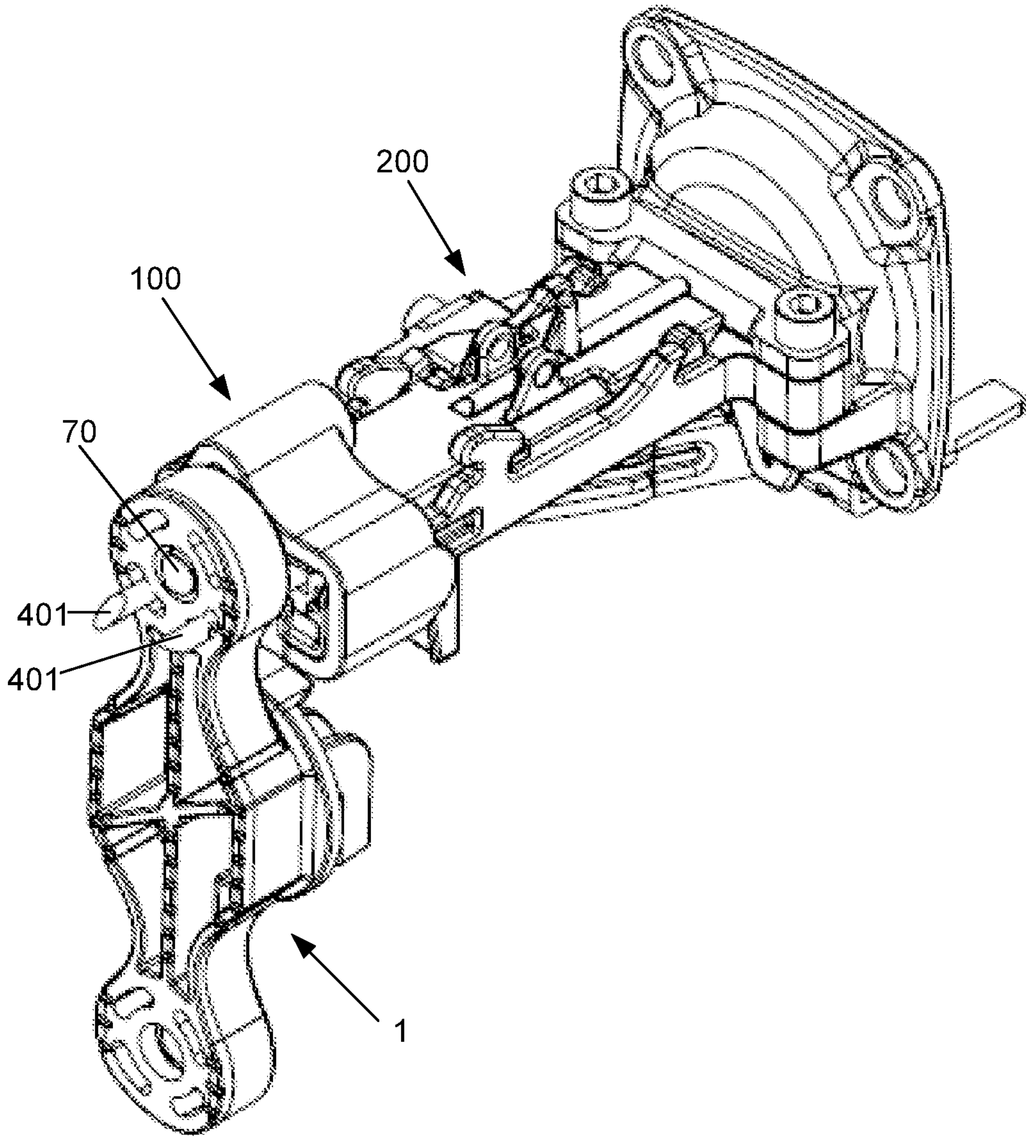
FIG. 16 shows a perspective view of an insulator, with a stapler muzzle attachment and stapler muzzle.
Figure 17:
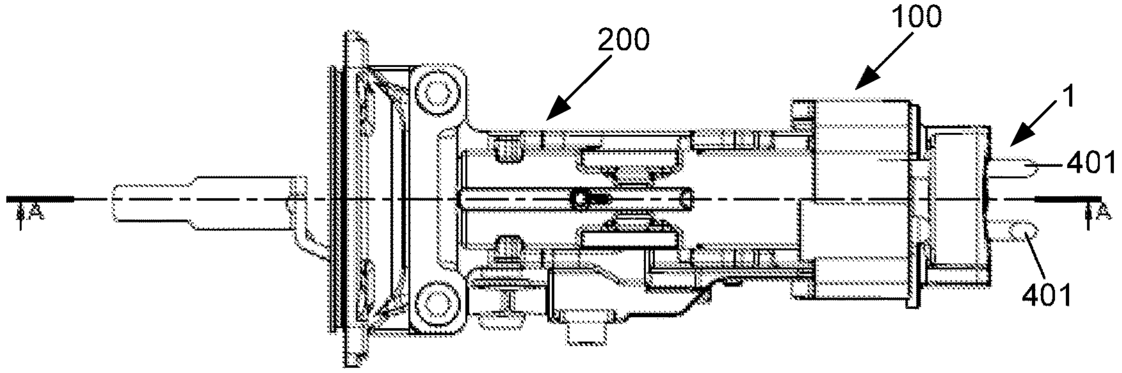
FIG. 17 shows an end view of the insulator, with a stapler muzzle attachment and stapler muzzle.
Figure 27:
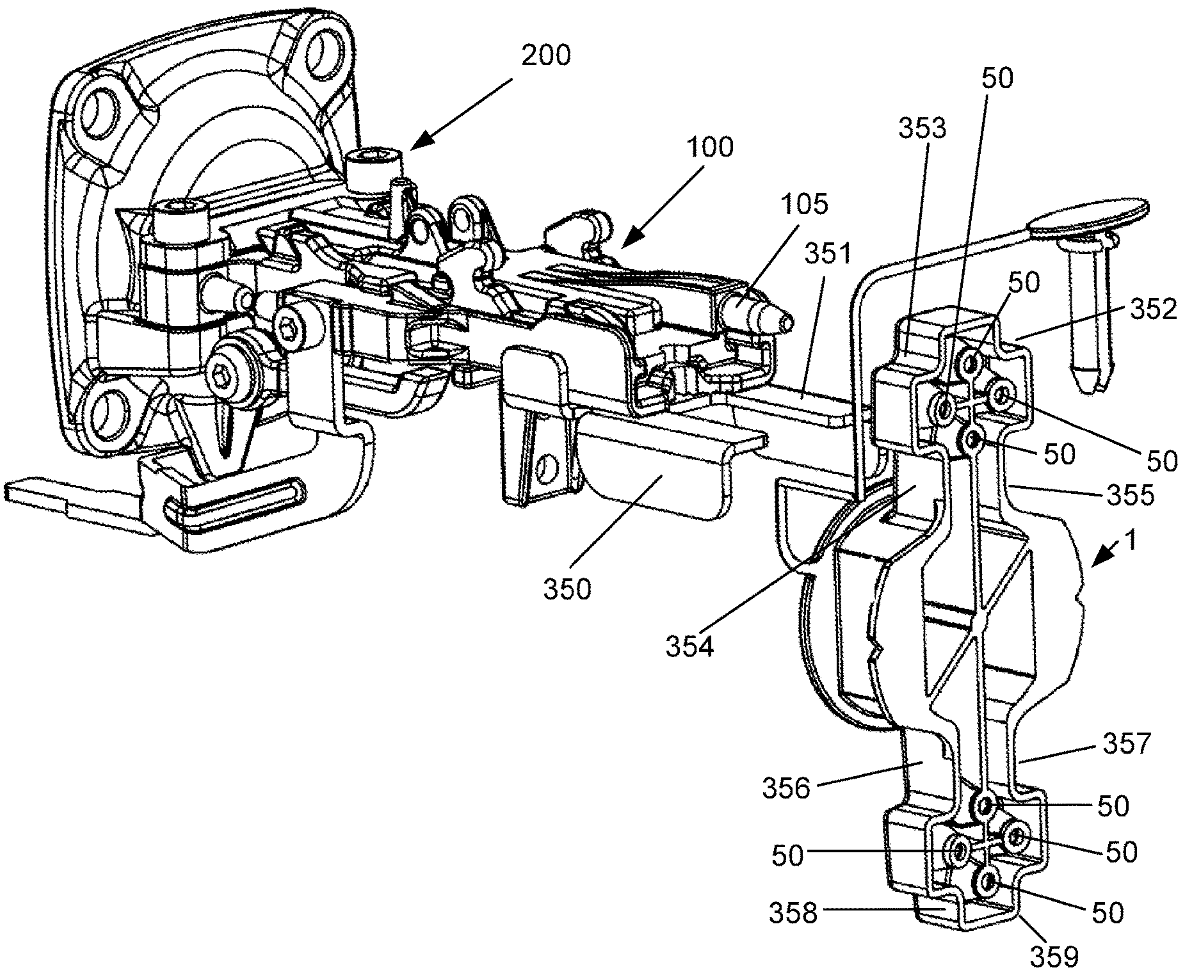
FIG. 27 shows a further exploded perspective view of an alternative insulator, an alternative stapler muzzle attachment and stapler muzzle, with the insulator connected to the stapler muzzle attachment.

FIGS. 10 to 15 show alternative implementations of the insulator of the present disclosure. The passages 50 may, for example, be open as shown in FIG. 10. Alternatively, the passages 50 may be a trefoil of three overlapping substantially circular passages as seen in FIGS. 11 and 12. More than one alignment member 70 may be provided on each of the mounting formations 40 and 41, and the alignment member of the stapler muzzle attachment may be configured to partially surround the shaped mounting formation such as shown in FIGS. 13 and 14, or fit into indents 402 and 403 in the mounting formation as shown in FIG. 10. FIG. 27 shows an alternative muzzle 100 having forks 350 and 351. In use, the forks 350 and 351 fit into ridges 352-359 in the insulator 1.

FIGS. 16 to 26 illustrate the insulator 1 and the staple muzzle attachment 100 with a muzzle 200 of a fastening tool/stapler. The fastening tool may be powered by pneumatic, electric, battery, CO2 or gas fuel. Referring to FIGS. 16 to 26, the insulator 1 is secured to an attachment 100 via a securing member 105. The stapler muzzle attachment 100 has a passage 130 into which the muzzle 200 of a stapler may be inserted. The staples 400 are aligned by staple alignment member 210. The securing member 105 also acts as a first alignment member.

Optionally, the fastening tool has a movable workpiece contact element, wherein each staple is prevented from being ejected from the tool until the workpiece contact element has been moved into a firing position.

The staple muzzle attachment 100 has a securing member 105 having a ball plunger 110 and a second alignment member 124. The second alignment member 124 is sprung using a spring 121 and is held in a passage 101 of the staple muzzle attachment 100 by a screw 122. The second alignment member protrudes from end 123 of the passage 101.

Figure 18:
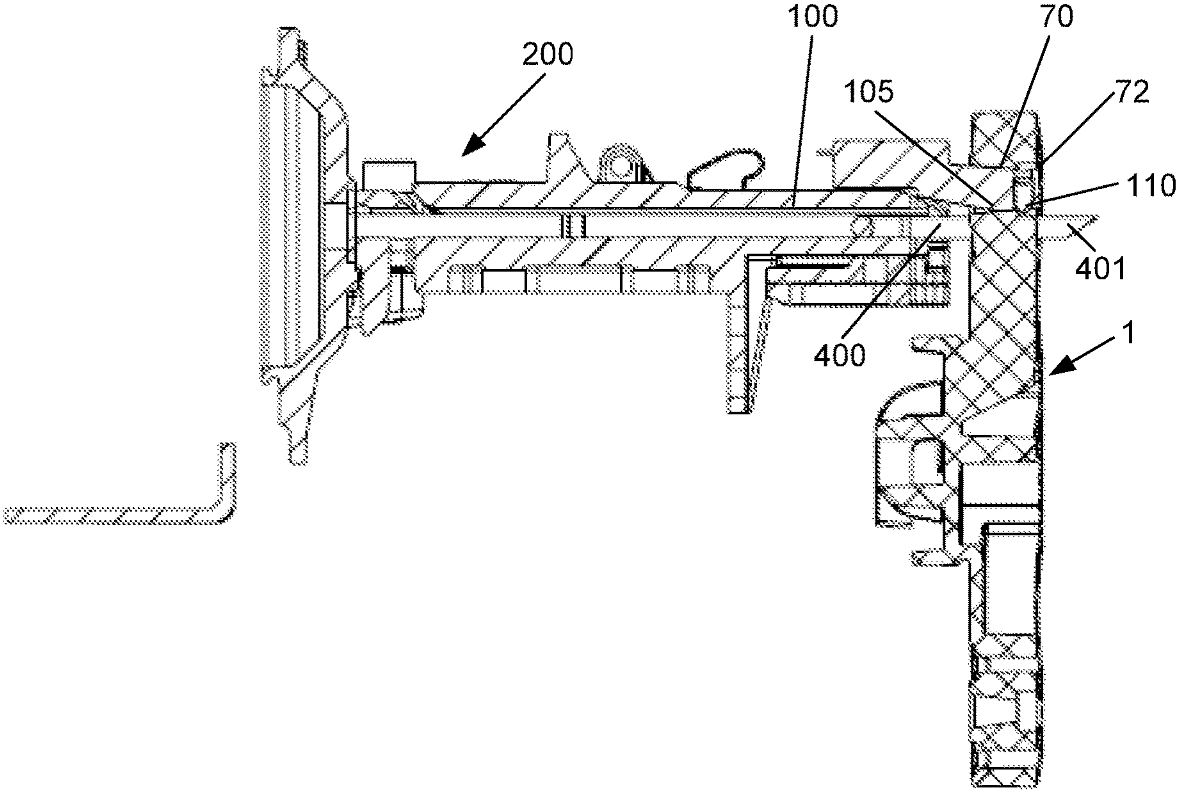
FIG. 18 shows a cross section of the insulator, stapler muzzle attachment and stapler muzzle of FIG. 17 taken along line A-A of FIG. 17.
Figure 19:
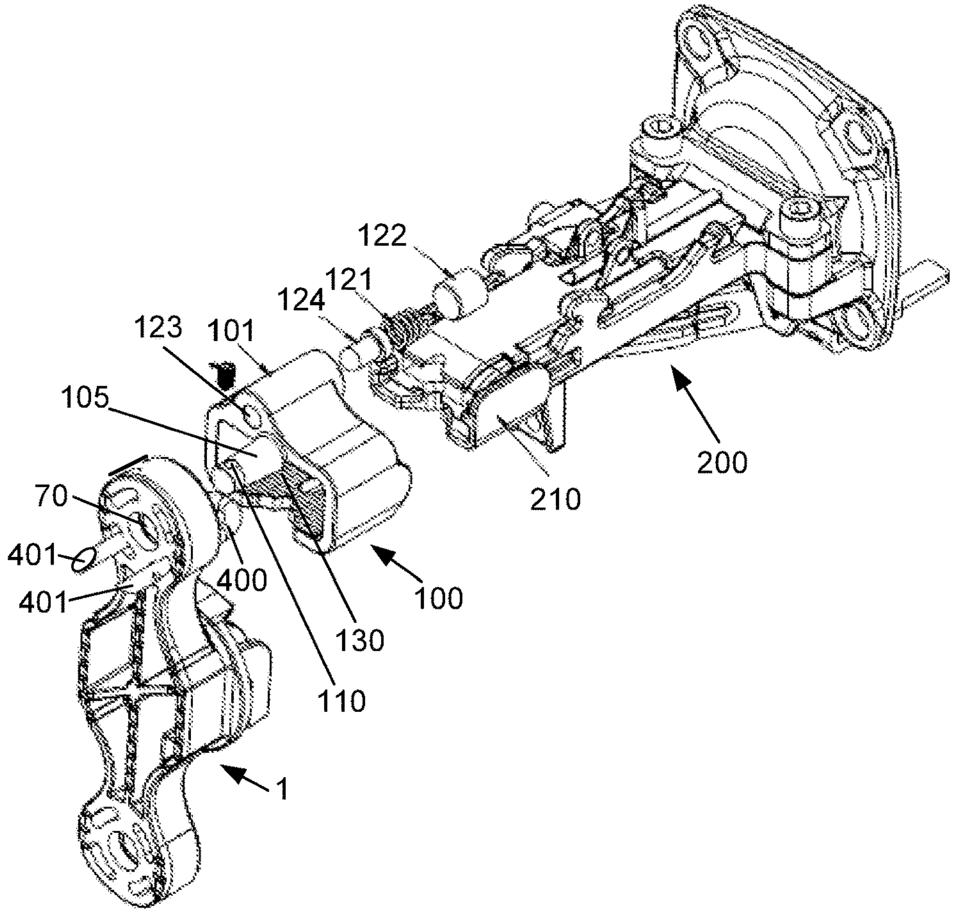
FIG. 19 shows a perspective exploded view of an insulator, a stapler muzzle attachment and stapler muzzle.
Figure 20:
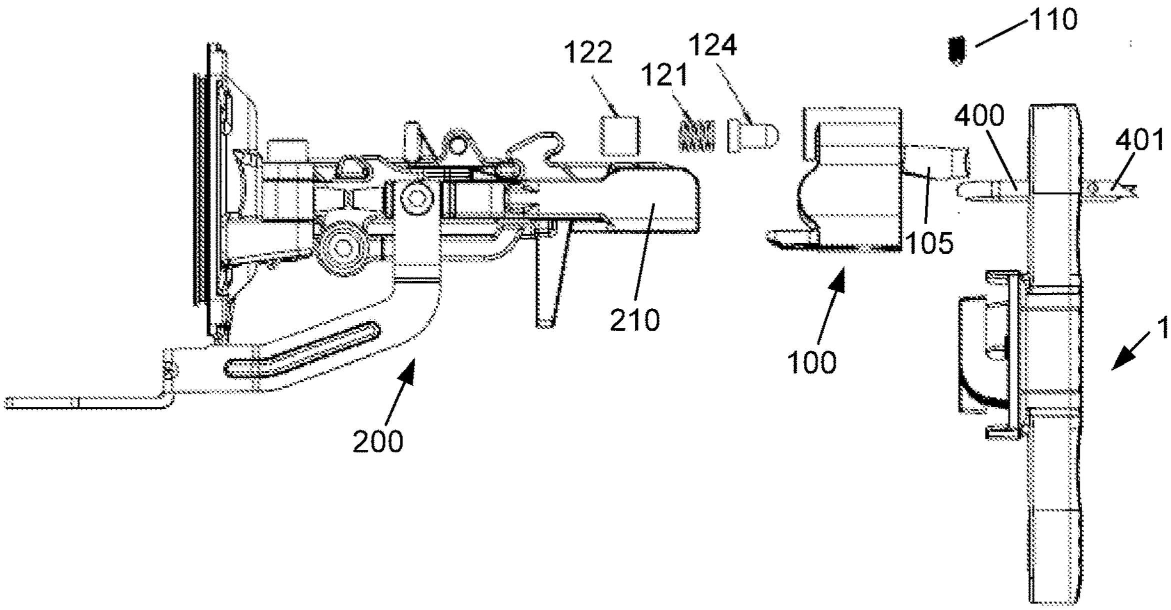
FIG. 20 shows a side exploded view of an insulator, a stapler muzzle attachment and stapler muzzle.
Figure 21:
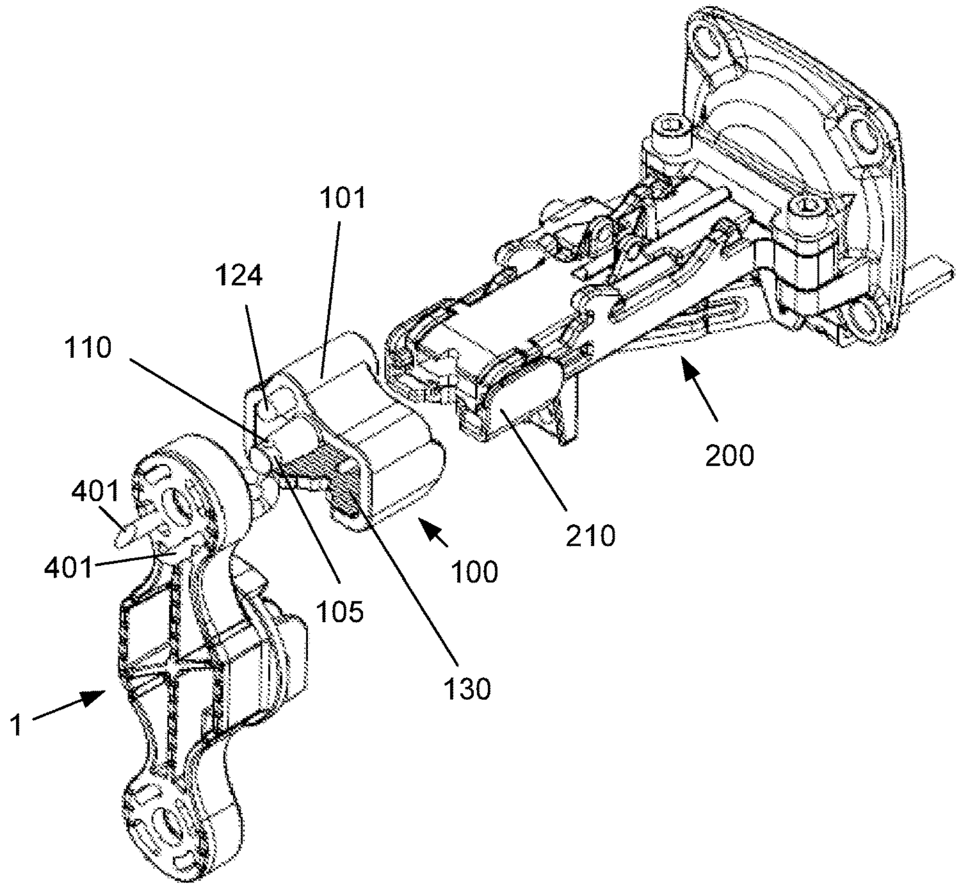
FIG. 21 shows a further exploded perspective view of an insulator, a stapler muzzle attachment and stapler muzzle.
Figure 22:
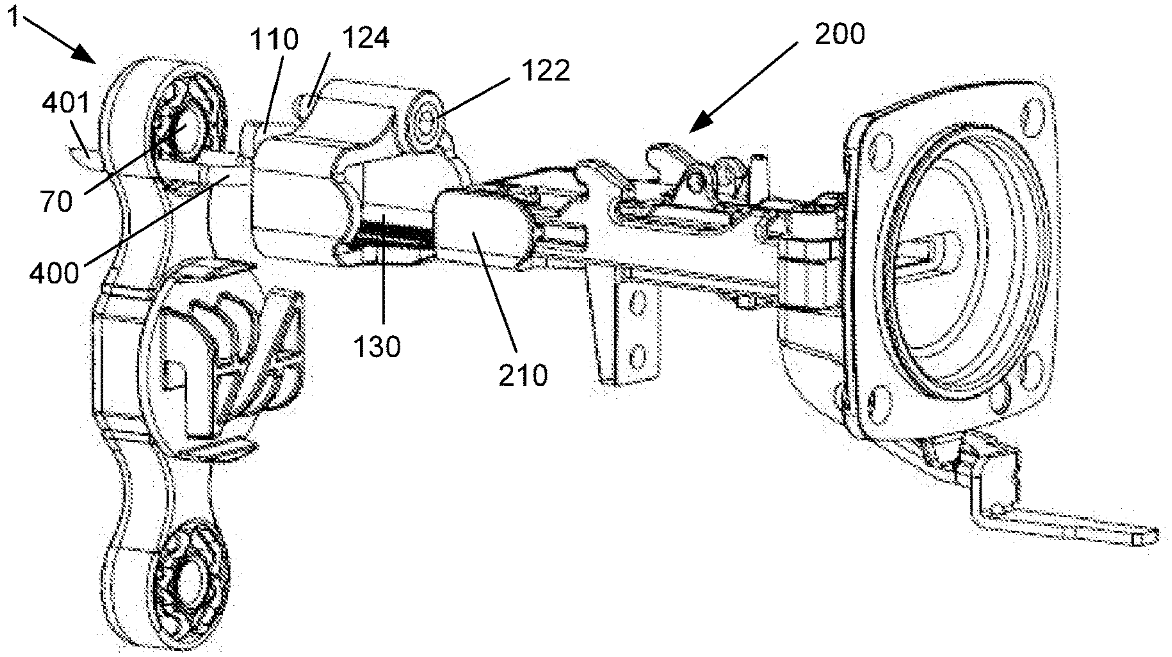
FIG. 22 shows a further 5 exploded perspective view of an insulator, a stapler muzzle attachment and stapler muzzle.
Figure 23:
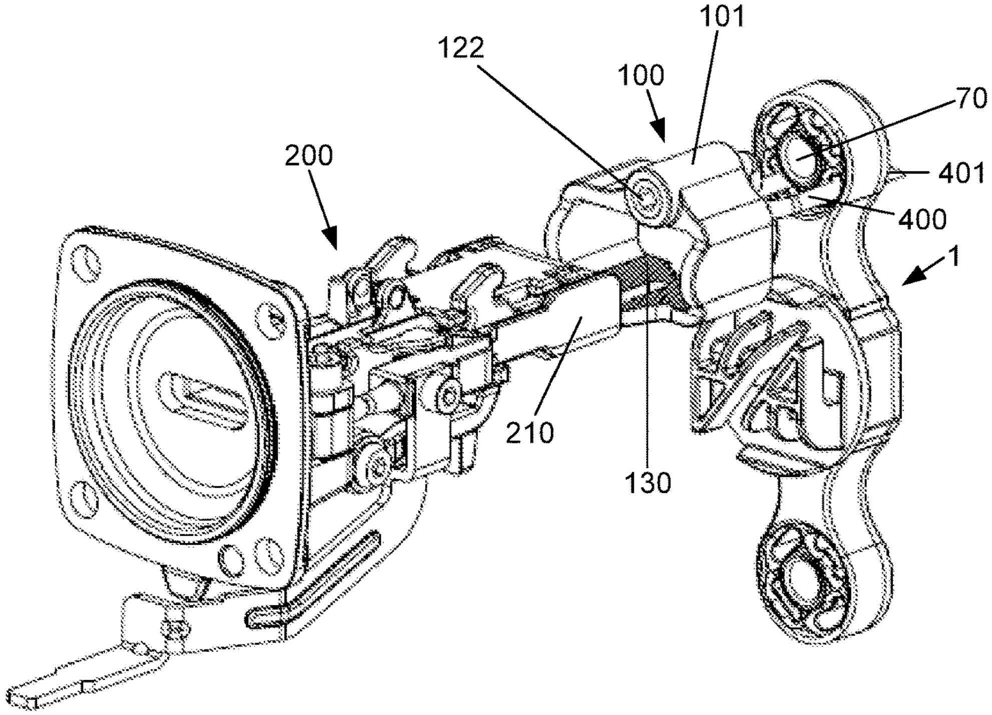
FIG. 23 shows a further exploded perspective view of an insulator, a stapler muzzle attachment and stapler muzzle.
Figure 24:
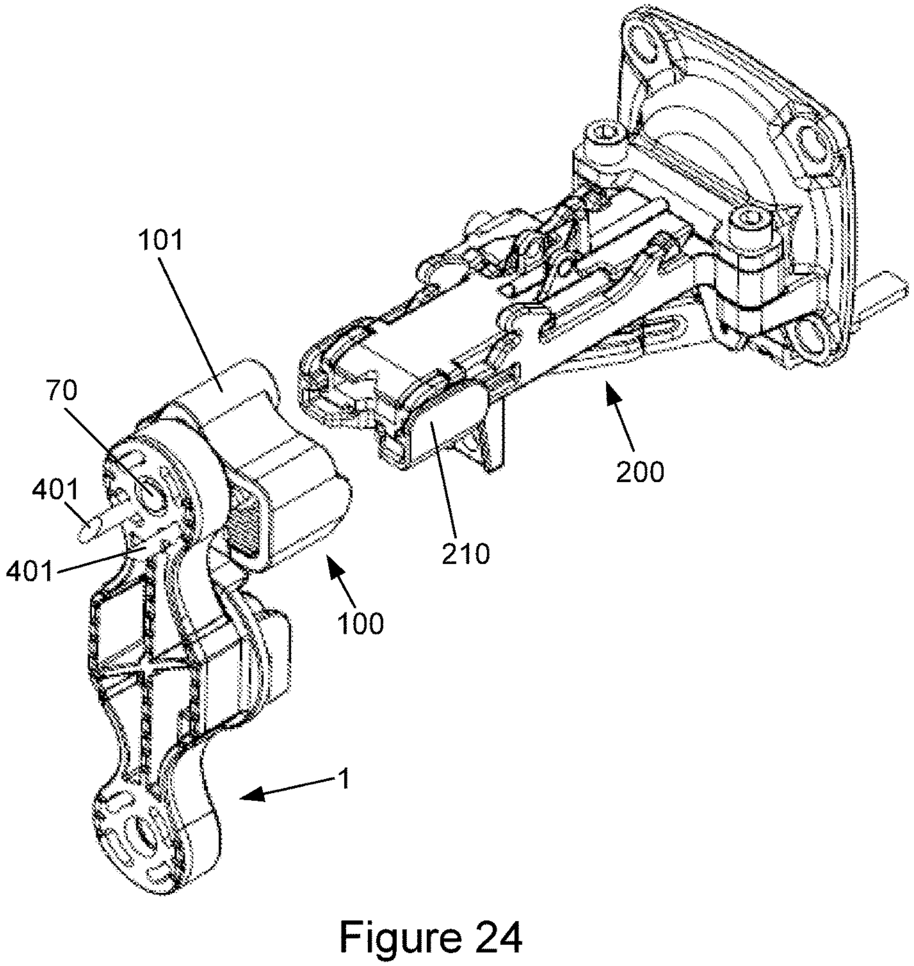
FIG. 24 shows a further exploded perspective view of an insulator, a stapler muzzle attachment and stapler muzzle, with the insulator connected to the attachment.
Figure 25:
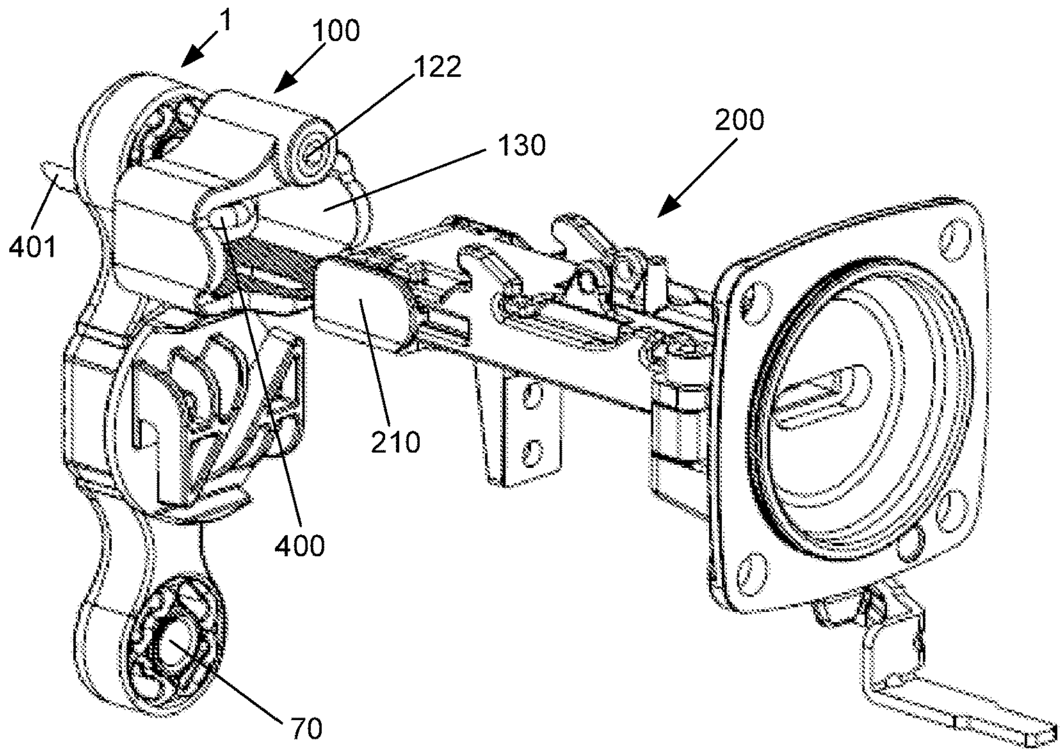
FIG. 25 shows a further exploded perspective view of an insulator, a stapler muzzle attachment and stapler muzzle, with the insulator connected to the stapler muzzle attachment.
Figure 26:
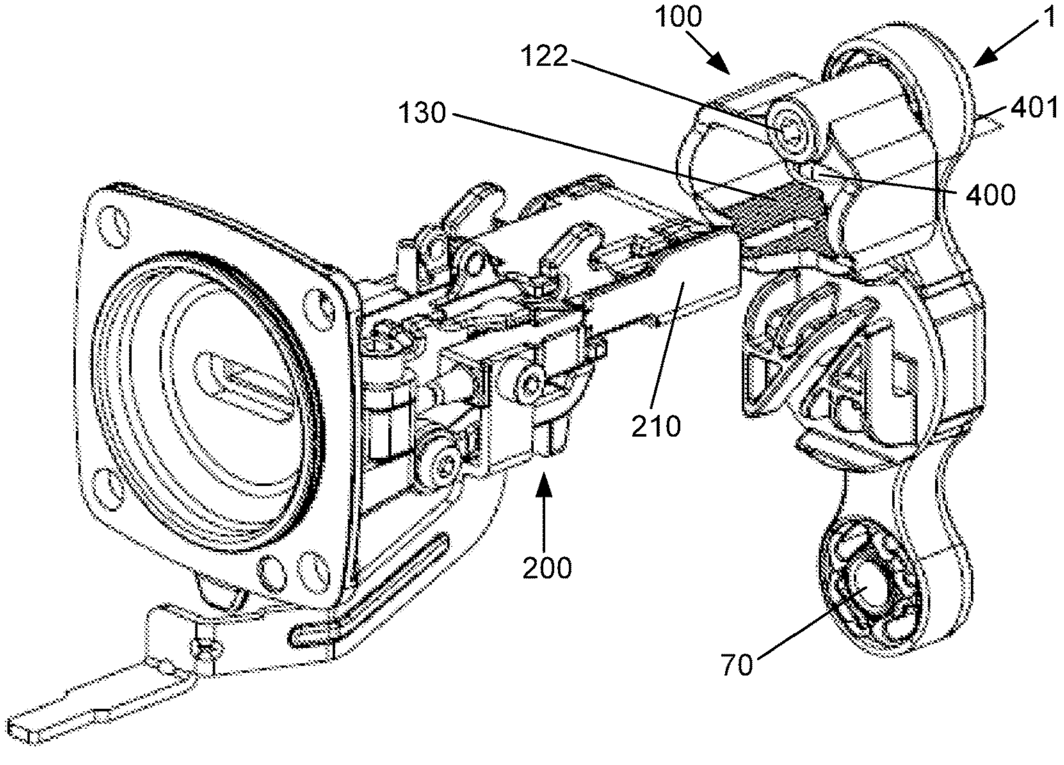
FIG. 26 shows a further exploded perspective view of an insulator, a stapler muzzle attachment and stapler muzzle, with the insulator connected to the stapler muzzle attachment.

Referring now to FIG. 18, in use, the securing member 105 is inserted into the alignment member 70 of the insulator 1 and the ball of the ball plunger 110 is located within the step 72 of the insulator alignment member 70. The securing member 105 allows the insulator 1 to rotate while being held to the staple muzzle attachment 100. In one embodiment, the insulator 1 can rotate 360 degrees while the insulator is attached to the attachment 100.

The second alignment member 124 of the staple muzzle attachment 100 protrudes into a passage 50 of the insulator 1 such that when that the legs 401 of a staple 400 are fired by a driver blade, the legs 401 pass through other passages 50 of the insulator 1. In use, a user rotates the attachment 100 with respect to an insulator 1 until the second alignment member 124 is within a passage 50. The bevel 61 assists the process. When the second alignment member 124 is within a passage 50, a stapler (when fired) will fire each leg 401 of a staple 400 though another passage 50 in the insulator 1. The passages 50 are located on the pitched circle 302 such that when the second alignment member 124 is within a passage 50, the legs 401 of a staple 400 are located such that each leg 401 passes through another passage 50 of the insulator 1. Alternatively, the passage into which the alignment member 124 is located may be the same passage through which a leg 401 of a staple 400 passes.

With the securing member 105 centered as the axis of a pitched circle 302, if the second alignment member 124 is located at zero degrees, the legs 401 of the staple 400 fire at 90 degrees and 270 degrees respectively. When the securing member/first alignment member 105 is engaged with the securing member 70 of the insulator and the second alignment member 124 is located in a passage 50, the second alignment member 124 may be swept freely within the arched slot passages 50, thereby allowing a limited sweep. The second alignment member 124, being spring-loaded, provides a resistance to, but not prevention of, rotation if swept between any two passages 50, to encourage correct alignment between a staple leg and a passage 50.

While the present disclosure has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the disclosure in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. An insulator comprising:

an insulator body having a front and back;

a formation configured to support a barrier; and a mounting formation having a front and a back, the back of the mounting formation configured to engage a support post, the mounting formation defining a plurality of staple leg passages extending through the mounting formation from the front to the back of the mounting formation, and the mounting formation including an alignment member, wherein the alignment member is engageable with an alignment tool of a staple driving tool; and the staple leg passages are disposed circumferentially around the alignment member, such that two legs of a staple can respectively extend through two adjacent staple leg passages of the plurality of staple leg passages.

2. The insulator of claim 1, wherein at least one of the plurality of staple leg passages is configured such that a passage alignment member is insertable into said staple leg passage.

3. The insulator of claim 1, which defines an aperture configured to receive a protrusion of an insulator securing member.

4. The insulator of claim 1, wherein the plurality of staple leg passages include four staple leg passages positioned such that two legs of a staple can be driven through any two adjacent staple leg passages of the four staple leg passages, and wherein the alignment member is configured to ensure the two legs of the staple are aligned with said two adjacent staple leg passages.

5. The insulator of claim 1, wherein the alignment member extends from the front to the back of the mounting formation.

6. An insulator comprising:

an insulator body;

a barrier support formation connected to the insulator body; and a mounting formation connected to the insulator body and having a front side and a back side, the mounting formation defining a plurality of staple leg passages extending transversely through the mounting formation from the front side to the back side, the plurality of staple leg passages positioned such that two legs of a staple can be driven through any two adjacent staple leg passages of the plurality of staple leg passages, the mounting formation including an alignment member, wherein the alignment member is engageable with an alignment tool of a staple driving tool; and the staple leg passages are disposed circumferentially around the alignment member.

7. The insulator of claim 6, wherein the barrier support formation includes a pair of spaced apart limbs, the limbs defining respective aligned holes through which a pin can pass.

8. The insulator of claim 7, wherein the pin is attached to the insulator.

9. The insulator of claim 6, which includes a second mounting formation having a front side and a back side, the second mounting formation defining a plurality of staple leg passages extending transversely through the second mounting formation from the front side to the back side, the plurality of staple leg passages positioned such that two legs of a second staple can be driven through any two adjacent staple leg passages of said plurality of staple leg passages.

10. The insulator of claim 6, wherein at least one of the staple leg passages is an arc slot.

11. The insulator of claim 6, wherein at least two of the staple leg passages are aligned on a pitch circle of the mounting formation.

12. The insulator of claim 6, wherein the mounting formation includes an alignment member.

13. The insulator of claim 12, wherein the alignment member is engageable by a first alignment member of a staple driving tool to align the staple driving tool such that the staple driving tool can drive the legs of the staple through the two adjacent staple leg passages.

14. The insulator of claim 13, wherein the alignment member includes a passage in the mounting formation.

15. The insulator of claim 13, wherein the alignment member includes a step.

16. The insulator of claim 13, wherein the alignment member is substantially circular to enable relative rotation of one of the insulator and the alignment member of the staple driving tool.

17. The insulator of claim 13, which includes a securing member configured to secure the insulator to a part of the staple driving tool.

18. The insulator of claim 6, wherein part of the back side of the mounting member is in configured to engage a round fence post.

19. An insulator comprising:

an insulator body;

a barrier support formation connected to the insulator body; and a mounting formation connected to the insulator body and having a front side and a back side configured to engage a fence post, the mounting formation defining a plurality of staple leg passages extending transversely through the mounting formation from the front side to the back side, the plurality of staple leg passages positioned such that two legs of a staple can be driven through any two adjacent staple leg passages of the plurality of staple leg passages, and the mounting formation including an alignment member engageable by a first alignment member of a staple driving tool to align the staple driving tool such that the staple driving tool can drive the legs of the staple through the two adjacent staple leg passages, wherein the alignment member includes a substantially circular passage in the mounting formation.

* * * * *